United States Patent
Lesher et al.

[15] 3,673,193
[45] June 27, 1972

[54] 4-OXO-1,8-NAPHTHYRIDINE-3-CARBOXYLATES AND DERIVATIVES THEREOF

[72] Inventors: George Y. Lesher, Schodack; Monte D. Gruett, East Greenbush, both of N.Y.

[73] Assignee: Sterling Drug Inc., New York, N.Y.

[22] Filed: May 11, 1970

[21] Appl. No.: 36,454

Related U.S. Application Data

[60] Division of Ser. No. 399,333, Sept. 25, 1964, abandoned, Continuation-in-part of Ser. No. 244,886, Dec. 17, 1962, abandoned, Continuation-in-part of Ser. No. 79,951, Jan. 3, 1961, Pat. No. 3,149,104.

[52] U.S. Cl....................260/295.5 B, 260/240 D, 260/999
[51] Int. Cl. .........................................................C07d 31/36
[58] Field of Search ...........................260/295.5 B, 295.5 N

[56] References Cited

UNITED STATES PATENTS

| | | | |
|---|---|---|---|
| 3,255,055 | 12/1965 | Lesher | 148/186 |
| 3,429,887 | 2/1969 | Lesher | 260/293.8 |
| 3,404,153 | 10/1968 | Lesher | 260/295.5 |

*Primary Examiner*—Alan L. Rotman
*Attorney*—Elmer J. Lawson, B. Woodrow Wyatt, Thomas L. Johnson, Robert K. Bair, William G. Webb and Roger T. Wolfe

[57] ABSTRACT

4-Oxo-1-substituted-1,8-naphthyridine-3-carboxylic acid derivatives, having antibacterial properties, prepared by 1-alkylating corresponding 4-hydroxy-1,8-naphthyridine-3-carboxylic acid derivatives.

10 Claims, No Drawings

4-OXO-1,8-NAPHTHYRIDINE-3-CARBOXYLATES AND DERIVATIVES THEREOF

This application is a division of our application Ser. No. 399,333, filed Sept. 25, 1964, now abandoned, which in turn is a continuation-in-part of our application Ser. No. 244,886, filed Dec. 17, 1962, now abandoned, which in turn is a continuation-in-part of our application Ser. No. 79,951, filed Jan. 3, 1961, now U.S. Pat. No. 3,149,104, issued Sept. 15, 1964.

This invention relates to 1,8-naphthyridines and particularly to 1,3-disubstituted-4-oxo compounds thereof, and to their preparation.

The invention sought to be patented, in its 1,3-disubstituted-4-oxo-1,8-naphthyridine aspect, is described as residing in the concept of a chemical compound having a molecular structure in which an organic radical having up to and including 18 carbon atoms and having a molecular weight not over 700 is attached through a saturated carbon atom thereof to the 1-nitrogen atom of 3-X-4-oxo-1,8-naphthyridines and 5,6,7,8-tetrahydro derivatives thereof where X stands for carboxy or a group convertible thereto by hydrolysis.

The physical embodiments of our invention have been tested by standard bacteriological and pharmacological evaluation procedures and found to have antibacterial, stimulant and sedative properties. They are also useful as intermediates in organic syntheses.

Illustrative and preferred embodiments of our 1,3-disubstituted-4-oxo-1,8-naphthyridines are those having the formula I

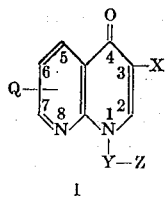

I where X is carboxy and salts thereof, carbalkoxy having from two to 19 carbon atoms inclusive, carbo-[(lower-tertiary-amino)-(polycarbon-lower-alkoxy)], cyano, carbamyl, aminocarbamyl or other groups convertible to carboxy by hydrolysis, Y is divalent aliphatic hydrocarbon attached to the ring-nitrogen atom through a saturated carbon atom and having from one to 10 carbon atoms inclusive, Z is a member of the group consisting of hydrogen, hydroxy, halo, carboxy, lower-carbalkoxy, cyano, carbamyl, lower-hydrocarbonoxy, lower-secondary-amino, lower-tertiary-amino, lower-cycloalkyl and AR, and Q stands for hydrogen or from 1 to 4 low-molecular weight substituents at positions 2,5,6 and 7 of the naphthyridine nucleus, said substituents selected from the group consisting of lower-alkyl, lower-alkoxy, lower-alkyl-mercapto, lower-alkyl-sulfinyl, lower-alkylsulfonyl, halo, hydroxy, hydroxy-(lower-alkyl), lower-alkoxy-(lower-alkyl), (lower-carboxylic-acyloxy)-(lower-alkyl), lower-alkyl-amino, di-(lower-alkyl)amino, nitro, amino, hydrazino, lower-carboxylic-acylamino, trihalomethyl, lower-alkanoyl, lower-alkanoyloxy, (lower-tertiary-amino)-(polycarbon-lower-alkyl), (lower-secondary-amino)-(polycarbon-lower-alkyl), (lower-tertiary-amino)-(polycarbon-lower-alkylamino), (lower-secondary-amino)-(polycarbon-lower-alkylamino), (lower-tertiary-amino)-(polycarbon-lower-alkoxy), (lower-secondary-amino)-(polycarbon-lower-alkoxy), AR, AR-O, AR-S, AR-NH, AR-(lower-alkyl), lower-cycloalkyl, lower-cycloalkyloxy, lower-cycloalkylmercapto, lower-cycloalkylamino, lower-cycloalkyl-(lower-alkyl), AR-(lower-alkenyl), AR-(halo-lower-alkenyl), AR-(lower-alkenyl), AR-C( = O), AR-CH(CN), AR-CH(OH), AR-O-CH$_2$, AR-(lower-alkoxy), cyano, triazo, amino-(lower-alkyl), (lower-carboxylic-acylamino)-(lower-alkyl), carbamyl, carboxy and lower-carbalkoxy, where AR is 1-2 ringed aryl. Unless otherwise indicated hereinabove or hereinbelow, the word "lower" when used with an alkyl moiety means alkyl, either straight- or branch-chained, having from one to six carbon atoms inclusive, e.g., lower-alkoxy stands for methoxy, ethoxy, n-propoxy, i-propoxy, n-butoxy, 2-butoxy, i-butoxy, n-pentoxy, 3-pentoxy and n-hexoxy. Particularly preferred embodiments of our invention because of their relative ease of preparation due to ready availability of intermediates and because of their high anti-bacterial, sedative or stimulant properties are the compounds having Formula I where Q is one or two substituents other than hydrogen and at least one is in the 7-position of the naphthyridine ring.

When Z of Formula I is hydrogen, Z-Y means aliphatic-hydrocarbon radicals having from one to 10 carbon atoms inclusive and having a saturated carbon atom linked to the 1-nitrogen atom of the 1,8-naphthyridine ring, and comprehends alkyl, alkenyl and alkynyl radicals, as illustrated by methyl, ethyl, n-propyl, isopropyl, 2-butyl, isoamyl, n-hexyl, n-octyl, n-decyl, and the like, when alkyl; 2-propenyl (allyl), 2-methyl-2-propenyl, 3-butenyl, 2-hexenyl, and the like, when alkenyl; and 2-propynyl (propargyl), 3-butynyl, 2-octynyl, and the like when alkynyl. When Z is other than hydrogen, as named above and illustrated below, the term "Z-(aliphatic-hydrocarbon),", i.e., Z-Y- as used in Formula I, means the above illustrated aliphatic-hydrocarbon radicals substituted by radicals as named above for Z and as further illustrated below or, in other words, Y or "aliphatic-hydrocarbon" is a divalent aliphatic hydrocarbon radical having from one to 10 carbon atoms and is linked to the ring-nitrogen atom of the naphthyridine nucleus through a saturated carbon atom.

The term "lower-carbalkoxy," as used herein, e.g., for Z in Formula I, means carbalkoxy radicals where the alkoxy portion can be straight- or branch-chained and has from one to six carbon atoms, as illustrated by carbomethoxy, carbethoxy, carbo-n-propoxy, carbisopropoxy, carbo-n-butoxy, carbo-n-hexoxy, and the like. Where Z is lower-carbalkoxy, Z-Y is exemplified by carbomethoxymethyl, 4-carbethoxybutyl and 3-carbo-n-butoxy-2-propenyl.

The term "lower-hydrocarbonoxy," as used herein, means hydrocarbonoxy radicals having from one to eight carbon atoms where hydrocarbon is, for instance, alkyl, alkenyl, alkynyl, cycloalkyl, cycloalkylalkyl, unsubstituted-phenyl, alkylated-phenyl, benzyl or phenethyl, as further illustrated by methyl, ethyl, n-propyl, isopropyl, 2-butyl, isoamyl, n-hexyl, and the like, when alkyl; ethenyl(vinyl), 2-propenyl, 3-butenyl, 2-hexenyl, and the like, when alkenyl; 2-propynyl(propargyl), 3-hexynyl, and the like, when alkynyl; cyclopropyl, cyclobutyl, cyclopentyl, cyclohexyl, cyclooctyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl. When Z is lower-hydrocarbonoxy, Z-Y is, e.g., 2-ethoxyethyl, 3-(2-propenoxy)-propyl and 4-phenoxy-2-butenyl.

The term "lower-cycloalkyl," as used herein, means cycloalkyl radicals having from three to eight ring-carbon atoms and having up to a total of about eight carbon atoms, as illustrated by cyclopropyl, cyclopentyl, cyclohexyl, 2-methylcyclohexyl, 4-ethylcyclohexyl, cyclooctyl, and the like. When Z is lower-cycloalkyl, Z-Y is, e.g., 4-cyclopropylbutyl and 2-cyclohexylpropyl.

The term "1–2 ringed aryl," as used herein, e.g., as "AR" for Z or Q in Formula I, means radicals having one or two aromatic rings which can be benzenoid or five- or six-membered hetero-aromatic, as illustrated by phenyl, naphthyl, biphenylyl, pyridyl, pyrimidyl, furyl, thiazolyl, quinolyl, oxazolyl, triazinyl, thienyl, and the like. Preferred embodiments of "1–2 ringed aryl," because of their commercial practicability due to availability of intermediates, are those where "AR" is phenyl, the benzene ring of which can bear low-molecular weight substituents, among which are, for purposes of illustration but without limiting the generality of the foregoing, lower-alkyl, lower-alkoxy, lower-alkylmercapto, lower-alkylsulfinyl, lower-alkylsulfonyl, halo, lower-alkylamino, di-(lower-alkyl)amino, nitro, amino, lower-carboxylic-acylamino, trihalomethyl, phenoxy, benzyloxy, benzoyl, lower-alkanoyl, (lower-tertiary-amino)-(polycarbon-lower-alkyl), (lower-secondary-amino)-(polycarbon-lower-alkyl), (lower-tertiaryamino)-(polycarbon-lower-alkylamino), (lower-secondary-amino)-(polycarbon-lower-alkylamino), (lower-tertiary-amino)-(polycarbon-lower-alkoxy), (lower-secondary-amino)-(polycarbon-lower-alkoxy), hydroxy, cyano, aminomethyl, carbamyl, carboxy, lower-carbalkoxy, unsubstituted-phenylmercapto, benzyl, 4-methoxyphenoxy, and the like. When the benzene ring is substituted, there are preferably from one to three substituents which can be in any of the available positions of the benzene ring, and where more than one substituent is present, they can be the same or different and they can be in any of the various position combinations relative to each other. The lower-alkyl, lower-alkoxy, lower-alkylmercapto, lower-alkyl-sulfinyl, lower-alkylsulfonyl, lower-alkylamino, lower-carboxylic-acylamino, lower-alkanoyl and the like substituents have preferably from one to six carbon atoms which can be arranged as straight or branched chains, and are illustrated by methyl, ethyl, n-hexyl, methoxy, isobutoxy, ethylmercapto, n-amylmercapto, methylsulfinyl, n-propylsulfinyl, isopropylsulfonyl, n-butylsulfonyl, ethylamino, n-butylamino, acetylamino, propionylamino, acetyl, propionyl, and the like. When AR is other than phenyl, e.g., naphthyl, biphenylyl, pyridyl, pyrimidyl, furyl, thiazolyl, quinolyl, oxazolyl, triazinyl, thienyl, etc., the rings thereof can bear substituents such as those listed above as substituents for the benzene ring. When Z is AR, AR-Y- is, e.g., 4-chlorobenzyl, 2-(2-pyridyl)ethyl, 6-(3,4-dimethoxyphenyl)hexyl and 2-(3,4-dibromophenyl)ethyl.

The term "lower-secondary-amino," as used herein, means secondary-amino radicals having preferably from one to about eight carbon atoms, as illustrated by: monocycloalkylamino radicals where the cycloalkyl group has preferably from three to eight ring-carbon atoms such radicals including cyclopropylamino, cyclobutylamino, cyclopentylamino, cyclohexylamino and cyclooctylamino; mono-(lower-hydroxyalkyl)amino radicals where the lower-hydroxyalkyl group has preferably two to six carbon atoms such radicals including 2-hydroxyethylamino, 3-hydroxypropylamino, 4-hydroxybutylamino, 2-hydroxypropylamino, 6-hydroxyhexyl-amino, etc.; mono-(lower-alkyl)amino radicals where the lower-alkyl group has preferably from one to six carbon atoms such radicals including methylamino, ethylamino, n-propylamino, isopropylamino, n-butylamino, 2-butylamino, isobutylamino, n-amylamino, n-hexylamino, etc.; mono-[(mono-carbocyclic-aryl)methyl]amino radicals, such radicals including benzylamino, 2-chlorobenzylamino, 3,4-dichlorobenzylamino, 3-nitrobenzylamino, 3,4-diethoxybenzylamino, 4-isopropylbenzylamino, 2,4,6-trichlorobenzylamino, etc.; and the like.

The term "lower-tertiary-amino," as used herein means tertiary-amino radicals having two nitrogen substituents such as those illustrated above for the lower-secondary-amino radicals, with preferred tertiary-amino radicals being di-(lower-alkyl)-amino radicals where the lower-alkyl radicals are alike or different and each alkyl radical has preferably from one to six carbon atoms, such dialkylamino radicals including dimethylamino, diethylamino, ethyl-methylamino, diisoproylamino, ethyl-n-propylamino, di-n-butylamino, di-n-hexylamino, and the like. This term "lower-tertiary-amino" also comprehends saturated N-heteromonocyclic radicals having five to six ring atoms, illustrated by 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 3-ethyl-1-pyrrolidyl, 2,5-dimethyl-1-pyrrolidyl; 4-morpholinyl; 1-piperazyl; alkylated-1-piperazyl such as 4-methyl-1-piperazyl, 4-ethyl-1-piperazyl, 2,4,6-trimethyl-1-piperazyl; and the like.

When Z stands for lower-secondary-amino or lower-tertiary amino, Y is preferably polycarbon-lower-alkyl and Z-Y is illustrated by 2-(2-hydroxyethylamino)ethylamino, 4-dimethylaminobutyl and 3-(1-piperidyl)propyl.

The term "polycarbon-lower-alkyl," as used herein, means lower-alkylene radicals preferably having from two to six carbon atoms and having its connecting linkages on different carbon atoms, e.g., $-CH_2CH_2-$, $-CH_2CH_2CH_2-$, $-CH_2CH_2CH_2CH_2-$, $-CH\overset{|}{C}HCH_3$, $-CH_2CH(CH_3)CH_2-$, $-CH_2\overset{|}{C}(CH_3)_2$, $-CH(CH_3)\overset{|}{C}H(CH_3)$, $-CH(CH_3)CH_2CH_2CH_2-$, $-CH_2CH_2CH_2CH_2CH_2CH_2-$, and the like.

The term "halo," as used herein as substituents for the naphthyridine ring, i.e., as Q, or as substituents for the lower-aromatic ring, means chloro, bromo, iodo, or fluoro.

The term "lower-carboxylic-acyl," as used herein, e.g., as a part of several meanings for Q, means lower-alkanoyl, lower-haloalkanoyl, lower-carboxyalkanoyl, (lower-tertiary-amino)-(lower-alkanoyl), and monocarbocyclic-aroyl, illustrated by formyl, acetyl, chloroacetyl, dichloroacetyl, propionyl, β-carboxypropionyl, diethylaminoacetyl, butyryl, benzoyl, 2-hydroxybenzoyl, 4-aminobenzoyl, 3-chlorobenzoyl, and the like.

The term "carbo-[(lower-tertiary-amino)-(polycarbon-lower-alkoxy)]," as used herein for X in Formula I, is illustrated by carbo-(2-di-n-butylaminoethoxy), carbo-(dimethylamino-2-pentoxy), carbo-[3-(1-piperidyl)propoxy], and the like.

The invention in its process aspect, is described as residing in the concept of reacting a 3-X-4-hydroxy-1,8-naphthyridine with an organic ester of a strong acid, i.e., an acid which is practically completely dissociated in aqueous solution. The organic moiety of the ester has up to and including 18 carbon atoms, has a molecular weight not over 700 and is attached to the anionic portion of the ester through a saturated carbon atom thereof. Illustrative and preferred organic esters are esters of a strong inorganic acid or an organic sulfonic acid, said ester having the formula Z-(aliphatic-hydrocarbon)-An, or Z-Y-An, where An is an anion of a strong inorganic acid or an organic sulfonic acid, e.g., chloride, bromide, iodide, sulfate, benzenesulfonate, para-toluenesulfonate, and the like, and Z and Y have the meanings given above for Formula I. The chloride, bromide or iodide is preferred because of the more ready availability of the requisite Z-(aliphatic-hydrocarbon) halides; and the reaction is carried out preferably in the presence of an acid-acceptor. The acid-acceptor is a basic substance which preferably forms freely water-soluble by-products easily separable from the product of the reaction, including for example, sodium hydroxide, potassium hydroxide, sodium carbonate, potassium carbonate, sodium alkoxides, potassium alkoxides, sodium amide, and the like. The purpose of the acid-acceptor is to take up the hydrogen halide (or HAn) which is split out during the course of the reaction. The reaction can be carried out either in the presence or absence of a suitable solvent, but preferably in a solvent such as a lower-alkanol, acetone, dioxane, dimethylformamide, dimethyl sulfoxide, or a mixture of such solvents, e.g., a mixture of water and a lower-alkanol. The reaction is generally carried out at a temperature between about room temperature (about 25° C.) and 150° C., preferably at reflux, in a lower-alkanol solvent, a mixture of water and a lower-alkanol, or dimethylformamide.

To illustrate the preparation of the preferred 1,3-di-substituted-4-oxo-1,8-naphthyridines of our invention having formula I, our process comprises reacting the corresponding 3-X-4-hydroxy-1,8-naphthyridine having the Formula II

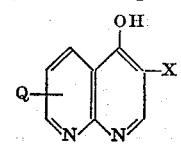

II where Q AND X have the meanings given above for Formula I, with an ester having the formula Z-Y-An, where Z and Y have the meanings given above for Formula I and An is an anion of a strong inorganic acid or an organic sulfonic acid, in the presence of an acid-acceptor.

When X is carboxy, i.e., when the intermediate is a 4-hydroxy-1,8-naphthyridine-3-carboxylic acid, the reaction is conveniently carried out by refluxing the acid with a Z-(aliphatic-hydrocarbon)ester, preferably halide, in aqueous ethanol in the presence of potassium or sodium hydroxide to yield the corresponding 1-(Z-Y)-4-oxo-1,8-naphthyridine-3-carboxylic acid; the same 3-carboxylic acid is also obtained using these reaction conditions and a lower-alkyl 4-hydroxy-1,8-naphthyridine-3-carboxylate as the intermediate, the ester hydrolyzing under the reaction conditions to form the acid. If the final product is desired in ester form, e.g., the ethyl ester, the intermediate ethyl 4-hydroxy-1,8-naphthyridine-3-carboxylate is reacted as above using refluxing ethanol as the solvent and sodium ethoxide as the acid-acceptor. The alkylation of the 4-hydroxy-1,8-naphthyridine-3-carboxylic acid can be carried out in the absence of an acid-acceptor by using its di-salt, e.g., by heating a mixture of the anhydrous dipotassium or disodium salt with diethyl sulfate followed by acidification to obtain the 1-ethyl-4-oxo-1,8-naphthyridine-3-carboxylic acid.

Some of the intermediate 4-hydroxy-1,8-naphthyridine-3-carboxylic acids and derivatives are known, e.g., 4-hydroxy-7-methyl-1,8-naphthyridine-3-carboxylic acid and ethyl ester, 7-ethoxy-4-hydroxy-1,8-naphthyridine-3-carboxylic acid and ethyl ester, and 4-hydroxy-1,8-naphthy-ridine-3-carboxylic acid. Other such intermediates, where novel, are prepared by generally known methods which are illustrated hereinbelow.

For example, the intermediate lower-alkyl 4-hydroxy-1,8-naphthyridine-3-carboxylate is obtained in two steps by first reacting a 2-aminopyridine with one molar equivalent of a dialkyl ethoxymethylenemalonate, preferably the diethyl ester, to yield a dialkyl N-(2-pyridyl)amino methylenemalonate and then cyclizing this compound by heating it in an appropriate solvent, e.g., diethyl phthalate, Dowtherm A (eutectic mixture of diphenyl and diphenyl ether), mineral oil, to obtain the intermediate lower-alkyl 4-hydroxy-1,8-naphthyridine-3-carboxylate. To obtain the lower-alkyl 7-acylamino-4-hydroxy-1,8-naphthyridine-3-carboxylate one starts with the 2,6-diaminopyridine and an acyl anhydride, preferably acetic anhydride, is included in the cyclizing step.

Also within the scope of the invention are salts of our above-described 1-substituted-4-oxo-1,8-naphthyridine-3-carboxylic acids. Preferred types of salts are those having cations which do not increase the toxicity of the compound as a whole toward animal organisms. These comprise the alkali metal salts, e.g., the sodium or potassium salts; the lower-alkaline earth metal salts, e.g., magnesium or calcium salts; and, the ammonium or organic amine salts, e.g., diethanolamine or N-methyl glucamine salts. Although medicinally acceptable salts are preferred, other and all cationic salts are within the scope of our invention. All such salts, including those having toxic cations, are useful in characterizing the free acids and as intermediates in purification of the free acids. The salts are prepared from the acids using methods illustrated hereinbelow in the example.

Preferred ester embodiments of our 1-aubstituted-4-oxo-1,8-naphthyridine-3-carboxylic acids are those derived from alkanols having up to 18 carbon atoms, phenols having up to 10 carbon atoms, (lower-tertiary-amino)-(polycarbon-lower-alkanols), (lower-secondary-amino)-(polycarbon-lower-alkanols). Other ester embodiments are the corresponding thiol esters prepared from the corresponding alkylmercaptans, substituted-alkylmercaptans and thiophenols. These esters and their preparation are further illustrated in the examples hereinbelow. Although medicinally acceptable esters are preferred, other and all esters are encompassed by the scope of the invention. All esters are useful in characterizing the free acids and/or as intermediates in purification of the free acids.

Similarly, like the salts and esters, all amide and hydrazide derivatives are within the scope of the invention, and they have the same utilities as the salts and esters. Preferred amide and hydrazide embodiments, which are prepared as illustrated in the examples, are those derived from ammonia or hydrazine, unsubstituted or substituted by one or more low-molecular substituents, e.g., lower-alkyl, lower-hydroxyalkyl, lower-carboxyalkyl, lower-carbalkoxyalkyl, (lower-tertiary-amino)-(polycarbon-lower-alkyl), monocarbocyclic-aryl, and the like.

In its broader aspect, our invention encompasses not only the aforementioned 1-substituted-3-X-4-oxo-1,8-naphthyridines where X stands for carboxy and salt, ester, amide and hydrazine derivatives thereof but also for corresponding compounds where X stands for other groups convertible to carboxy by hydrolysis, e.g., where X stands for C(=NH)O-(lower-alkyl), C(=NH)NH$_2$, C(=NH)NH(lower-alkyl), C(=S)OH, C(=S)SH and C(=O)-halide.

Other compounds encompassed by our invention are bis-compounds prepared by our process using bis-esters having the formula An-Y-An where Y has the meaning given above for Formula I and where, in each instance, An is attached to a saturated carbon atom, e.g., the reaction of 4-hydroxy-7-methyl-1,8-naphthyridine-3-carboxylic acid with 1,3-diiodopropane, 1,6-dibromohexane or 1,4-diiodo-2-butene to yield, respectively, 1,3-bis(3-carboxy-7-methyl-4-oxo-1,8-naphthyridyl-1)propane, 1,6-bis(3-carboxy-7-methyl-4-oxo-1,8-naphthyridyl-1)hexane or 1,4-bis(3-carboxy-7-methyl-4-oxo-1,8-naphthyridyl-1)-2-butene. Other bis-compounds encompassed by our invention are those where the two naphthyridine rings are connected by a bis-ester grouping through the 3-carboxy substituent, e.g., the bis-ester obtained by first reacting 1-ethyl-7-methyl-4-oxo-1,8-naphthyridine-3-carboxylic acid with phosphorus oxychloride to form the corresponding 3-carboxylic acid chloride and then reacting two molar equivalents of the acid chloride with a diol, e.g., 1,3-propanediol, 1,4-dihydroxy-2-butene and 1,6-hexanediol.

Our 1-substituted-4-oxo-1,8-naphthyridine-3-carboxylic acids and derivatives have the further utility as intermediates in the preparation of other of our 1-substituted-4-oxo-1,8-naphthyridine- 3-carboxylic acids and derivatives, as illustrated below for the preparation of preferred 7-substituted-naphthyridine embodiments.

For example, the 7-amino-4-oxo-1-substituted-1,8-naphthyridine-3-carboxylic acids and derivatives are conveniently converted into the corresponding 7-diazonium salts which in turn are converted into other 7-substituted-4-oxo-1-[Z-(aliphatic-hydrocarbyl)]-3-carboxylic acids and derivatives, e.g., the corresponding 7-halo and 7-hydroxy compounds. The 7-amino-4oxo-1-substituted-1,8-naphthyridine-3-carboxylic acids are prepared by reacting a lower-alkyl 7-acylamino-4-hydroxy-1,8-naphthyridine-3-carboxylate, e.g., the ethyl 7-acetylamino compound, with a Z-(aliphatic-hydrocarbonating) agent, e.g., ethyl iodide or benzyl chloride, to obtain the lower-alkyl 7-acylamino-4-oxo-1-substituted-1,8-naphthyridine-3-carboxylate, e.g., the ethyl 7-acetylamino-4-oxo-1-(ethyl or benzyl)-1,8-naphthyridine-3-carboxylate, which is then hydrolyzed with an acidic agent, e.g., HCl to remove both the ester and N-acyl groups.

7-Hydroxy-4-oxo-1-substituted-1,8-naphthyridine-3-carboxylic acids and derivatives are also useful as intermediates for preparation of the corresponding 7-halo compounds by their reaction with a halogenating agent effective to convert hydroxy to halo, e.g., phosphorus oxychloride, thionyl chloride, phosphorus tri- or pentachloride to produce the corresponding 7-chloro compound or phosphorus tribromide to produce the 7-bromo compound.

The 7-halo-4-oxo-1-substituted -1,8naphthyridine-3-carboxylic acids and derivatives, in turn, are useful for the preparation of other corresponding 7-substituted compounds, for example, the 7-alkoxy, 7-phenyloxy, 7-alkylmercapto, 7-phenylmercapto, 7-alkylamino, 7-phenyl-amino, 7-dialkylamino, 7-hydrazino, 7-[(lower-tertiary-amino- or lower-secondary-amino)-(polycarbon-lower-alkyl)-amino], 7-[(lower-tertiary-amino or lower-secondary-amino)-(polycarbon-lower-alkyloxy)] compounds by reacting the corresponding 7-halo compound respectively, for example, with sodium alkoxide, sodium phenoxide, sodium alkylmercaptide, sodium phenylmercaptide, alkylamine, phenylamino, dialkylamine, hydrazine, tertiary-amino- or secondary-amino-alkylamine, sodium tertiary-amino- or secondary-amino-alkoxide. The 7-halo compound also can be catalytically reduced to remove the 7-halo substituent to yield the corresponding 7-unsubstituted-4-oxo-1-[Z-(aliphatic-hydrocarbyl)]-1,8-naphthyridine-3-carboxylic acid and derivatives.

As pointed out above, the 4-oxo-1-substituted-1,8-naphthyridine-3-carboxylic acids are useful for the preparation of their salt, ester, amide and hydrazide derivatives using methods for converting carboxylic acids into said derivatives. These methods are illustrated in the specific exemplary disclosure hereinbelow. These derivatives also have antibacterial and pharmacological properties, as illustrated in the specific examples below.

The lower-alkyl esters of our 4-oxo-1-substituted-1,8-naphthyridine-3-carboxylic acids, especially methyl and ethyl esters, are useful in their reaction with hydrazines and ammonia or amines to form the corresponding hydrazides and amides, respectively. Also, they can be reacted with higher homologous alkanols, e.g., n-butanol, 1,3-dimethylhexanol, n-decanol, or with an aminoalcohol, e.g., 3-(1-piperidyl)propanol or 4-dimethylamino-butanol, by an ester exchange reaction to yield the corresponding higher alkyl or aminoalkyl ester, e.g., n-butyl, 1,3-dimethyl, hexyl, n-decyl, 3-(1-piperidyl)propyl or 4-dimethylaminobutyl ester, respectively.

4-Hydroxy-7-[2-(aryl)-ethenyl]-1,8-naphthyridine-3-carboxylic acids and derivatives are disclosed and claimed in our U.S. Pat. No. 3,149,104, issued Sept. 15, 1964. Compounds of this type can be prepared by reacting the corresponding lower-alkyl 4-hydroxy-7-methyl-1,8-naphthyridine-3-carboxylate with an aryl aldehyde, e.g., benzaldehyde, or pyridine-2-aldehyde, in the presence of a mixture of a lower-alkanoic acid and anhydride, e.g., acetic acid and acetic anhydride, preferably by heating in the range of about 100° C. to about 150° C., thereby yielding the corresponding lower-alkyl 4-hydroxy-7-[2-(aryl)-ethenyl]-1,8-naphthyridine-3-carboxylate, e.g., the corresponding 7-(2-phenyl-ethenyl) (i.e., 7-styryl) or 7-[2-(2-pyridyl)ethenyl] ester. The corresponding acid is obtained by saponification of the ester and, in turn, can be converted into other esters or salt, amide or hydrazine derivatives, e.g., those defined hereinabove for our 1-substituted-4-oxo-1,8-naphthyridine-3-carboxylic acids.

Our 4-oxo-1-substituted-1,8-naphthyridine-3-carboxylic acids and derivatives when containing a basic moiety, i.e., a lower-tertiary- or -secondary-amino moiety, for example, a 2-diethylaminoethyl ester, a 1-[3-(1-piperidyl)propyl] compound or a 7-(4-n-propylamino-butoxyl) compound, are useful both in the free base form and in the form of acid-addition salts; and both forms are within the purview of the invention, and, in fact, are considered to be one and the same invention. The acid-addition salts are simply a more convenient form for use; and in practice, use of the salt form inherently amounts to use of the base form. The acids which can be used to prepare the acid-addition salts include preferably those which produce, when combined with the free base, medicinally acceptable salts, that is, salts whose anions are relatively innocuous to the animal organism in medicinal doses of the salts, so that the beneficial physiological or antibacterial properties inherent in the free base are not vitiated by side effects ascribable to the anions. In practicing our invention, we found it convenient to form the hydrochloride salts. However, other appropriate medicinally acceptable salts within the scope of the invention are those derived from mineral acids such as hydrobromic acid, hydriodic acid, nitric acid, phosphoric acid, sulfamic acid, and sulfuric acid; and organic acids such as acetic acid, citric acid, tartaric acid, lactic acid, methanesulfonic acid, ethanesulfonic acid, benzenesulfonic acid, p-toluenesulfonic acid, quinic acid, and the like, giving the hydrobromide, hydriodide, nitrate, phosphate, sulfamate, acetate, citrate, tartrate, lactate, methanesulfonate, ethanesulfonate, benzenesulfonate, p-toluenesulfonate and quinate, respectively.

The acid-addition salts of said basic compounds are prepared either by dissolving the free base in aqueous or aqueous-alcohol solution containing the appropriate acid and isolating the salt by evaporating the solution, or by reacting the free base and acid in an organic solvent, in which case the salt separates directly or can be obtained by concentration of the solution.

Although medicinally acceptable salts of said basic compounds are preferred, all acid-addition salts are within the scope of our invention. All acid-addition salts are useful as sources of the free base form even if the particular salt per se is desired only as an intermediate product as for example when the salt is formed only for purposes of purification or identification, or when it is used as an intermediate in preparing a medicinally acceptable salt by ion exchange procedures.

Also encompassed by our invention are quaternary-ammonium salts of the aforesaid compounds containing a lower-tertiary-amino moiety. These salts are useful for further identification of the aforesaid tertiary-amino compounds. The quaternary ammonium salts are obtained by the addition of esters having a molecular weight less than about 200 to the free base form of the compounds. A preferred class of esters comprises alkyl, alkenyl or aralkyl esters of inorganic acids or organic sulfonic acids, and include such compounds as methyl chloride, methyl bromide, methyl iodide, ethyl bromide, propyl chloride, 2-hydroxyethyl bromide, allyl chloride, allyl bromide, methyl sulfate, methyl benzenesulfonate, methyl p-toluenesulfonate, benzyl chloride, benzyl bromide, and substituted benzyl halides, such as p-chlorobenzyl chloride, p-nitrobenzyl chloride, o-chlorobenzyl chloride, p-methoxybenzyl chloride, and the like. The quaternary ammonium salts are prepared by mixing the free base and the alkyl, alkenyl or aralkyl esters in an organic solvent inert under the conditions of reaction, for example, ethanol, methanol, ether, acetonitrile and the like. Heating can be used to facilitate the reaction, although salt formation usually takes place readily at room temperature. The quaternary ammonium salt separates directly or can be obtained by concentration of the solution.

The molecular structures of the final products and intermediates of our invention are established by their mode of synthesis and confirmed by the correspondence of calculated and found values for the elementary analyses for representative examples and by infrared, ultraviolet and NMR spectral analyses.

Our 1-[Z-(aliphatic-hydrocarbyl)]-4-oxo-1,8-naphthyridine-3-carboxylic acids and derivatives when tested according to standard in vitro bacteriological evaluation procedures possess antibacterial activity, for example, against organisms such as *Staphylococcus aureus, Eberthella typhi, Clostridium welchii*, as illustrated below in the examples. Preferred embodiments also were found to have significant in vivo activity against gram-negative bacteria, e.g., *Klebsiella pneumoniae, Salmonella typhimurium*, in mice when administered orally and/or subcutaneously at dose levels in the range of about 100 to 400 mg./kg./d. Embodiments were found to increase the hexobarbital-induced sleeping time in mice when administered intraperitoneally forty minutes before intraperitoneal administration of 40 mg./kg. of hexobarbital. Results in the following examples are given in terms of the number of animals caused to exhibit a loss of righting reflex for 1 minute or more at a given dose level, e.g., 200 mg./kg., or in terms of $ED_{50}$, i.e., the effective dose in mg./kg. that caused 50 per cent of the animals to exhibit a loss of righting reflex for 1 minute or more. Positive results in this barbital-potentiating test indicate the compound tested has central nervous system depressant activity and is useful as a potentiator for barbiturates.

The following examples will further illustrate the invention without, however, limiting it thereto.

EXAMPLE 1

1-Ethyl-7-methyl-4-oxo-1,8-naphthyridine-3-carboxylic acid was prepared as follows: A mixture containing 11.6 g. of 4-hydroxy-7-methyl-1,8-naphthyridine-3-carboxylic acid, 11.1 g. of potassium hydroxide, 230 cc. of ethanol (95percent here and elsewhere unless otherwise indicated) and 81 cc. of water was refluxed until the solids dissolved. To this solution was added 28 cc. of ethyl iodide and the resulting mixture was refluxed for 5 days. The reaction mixture was cooled in an ice bath; and the resulting precipitate was collected, recrystallized from acetic acid, washed with water and dried in a vacuum oven (at about 70° C.) to yield 8.7 g. (66 percent yield) of the crystalline product, 1-ethyl-7-methyl-4-oxo-1,8-naphthyridine-3-carboxylic acid, m.p. 226.8°–230.2° C. (corr.).

Anal. Calcd. for $C_{12}H_{12}N_2O_3$: C, 62.05; H, 5.21; N, 12.06; N.E. (neutral equivalent), 232.

Found: C, 62.12; H, 5.47; N, 11.92; N.E., 229.

The foregoing preparation was carried out using a shorter reaction period as follows: A warm solution containing 41 g. of 4-hydroxy-7-methyl-1,8-naphthyridine-3-carboxylic acid and 39 g. of potassium hydroxide in 1 liter of ethanol and 200cc. of water was treated with 50 cc. of ethyl iodide and the resulting mixture was refluxed gently overnight, acidified with hydrochloric acid and cooled. The resulting precipitate was collected and recrystallized twice from acetonitrile to yield 26 g. (56 percent yield) of 1-ethyl-7-methyl-4-oxo-1,8-naphthyridine-3-carboxylic acid, m.p. 229°–230° C.

1-Ethyl-7-methyl-4-oxo-1,8-naphthyridine-3-carboxylic acid when tested according to standard in vitro bacteriological evaluation procedures was found to possess antibacterial activity, for example, as follows:

| Organism | Log Reciprocal Minimum Effective Concentration (mg./cc.) | |
|---|---|---|
| | Bacteriostatic | Bactericidal |
| *Staphylococcus aureus* | 4.3 | >3.3 |
| *Eberthella typhi* | 4.3 | 3.9 |
| *Clostridium welchii* | 4.6 | >3.3 |

1-Ethyl-7-methyl-4-oxo-1,8-naphthyridine-3-carboxylic acid was found to have significant in vivo activity against *Klebsiella pneumoniae* in mice when administered orally or subcutaneously at dose levels as low as 100 mg./kg./d. and, also, against *Salmonella typhimurium* in mice when administered subcutaneously at dose level as low as 100 mg./kg./d. This compound when tested according to the procedure described hereinabove for potentiation of hexobarbital sleeping time in mice was found to have an $ED_{50}$ of less than 50 mg./kg. This same compound was found to have an acute oral toxicity ($LD_{50}$) in mice of 4,000 mg./kg. after 24 hours and 3,300 ± 975 after 7 days and an acute subcutaneous toxicity ($LD_{50}$) in mice of 500 ± 52 mg./kg.

EXAMPLE 2

Sodium 1-ethyl-7-methyl-4-oxo-1,8-naphthyridine-3-carboxylate was prepared by warming on a steam bath a mixture of 6.9 g. of 1-ethyl-7-methyl-4-oxo-1,8-naphthyridine-3-carboxylic acid, 1.1 g. of sodium hydroxide and 150 cc. of ethanol until dissolution resulted. The warm solution was filtered, the filtrate allowed to cool, and the solid collected and air-dried. There was thus obtained 7.5 g. of sodium 1-ethyl-7-methyl-4-oxo-1,8-naphthyridine-3-carboxylate, m.p. 270.6°–272.0° C. (corr.), with decomposition.

Anal. Calcd. for $C_{12}H_{11}N_2NaO_3$: N, 11.02; Na, 9.06.

Found: $H_2O$, 5.95; N(dry basis), 10.68; Na(dry basis), 9.00.

Sodium 1-ethyl-7-methyl-4-oxo-1,8-naphthyridine-3-carboxylate was found to have significant in vivo activity against *Klebsiella pneumoniae* in mice when administered orally at dose levels as low as 100 mg./kg./d.

EXAMPLE 3

Calcium 1-ethyl-7-methyl-4-oxo-1,8-naphthyridine-3-carboxylate was prepared as follows: To a solution containing 12 g. of 1-ethyl-7-methyl-4-oxo-1,8-naphthyridine-3-carboxylic acid, 25 cc. of 10 percent aqueous potassium hydroxide solution and 300 cc. of water was added with stirring a solution containing 30 g. of calcium acetate dihydrate. The reaction mixture was stirred at room temperature for about 10 minutes; and the resulting precipitate was collected, washed with water and air-dried. The solid was recrystallized once from methanol-water (4:1), a second time from methanol-water (5:1), and then air-dried to yield 5.5 g. of calcium di-(1-ethyl-7-methyl-4-oxo-1,8-naphthyridine-3-carboxylate), m.p. >300° C. (corr.).

Anal. Calcd. for $C_{24}H_{22}CaN_4O_6$: C, 57.40; H, 4.40; N, 11.14.

Found: C, 57.16; H, 4.67; N, 11.35.

Calcium di-(1-ethyl-7-methyl-4-oxo-1,8-naphthyridine-3-carboxylate) was found to have significant in vivo activity against *Klebsiella pneumoniae* in mice when administered orally at a dose level as low as 100 mg./kg./d. This same compound when tested according to the procedure described hereinabove for potentiation of hexobarbital sleeping time in mice was found to have an $ED_{50}$ of 120 ± 20 mg./kg.

EXAMPLE 4

1,7-Dimethyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 49 g. of potassium hydroxide, 400 cc. of ethanol, 140 cc. of water, 55 cc. of methyl iodide and a reflux period of 5 days. The reaction mixture was cooled in an ice bath and the solid that separated was collected, washed twice with acetone and dried in a vacuum oven (about 70° C.). The solid was dissolved in water, boiled with decolorizing charcoal and filtered. The filtrate was acidified with concentrated hydrochloric acid and the resulting white percipitate was collected and recrystallized twice from dimethylformamide to yield 11.0 g. of 1,7-dimethyl-4-oxo-1,8-naphthyridine-3-carboxylic acid, m.p. >300° C. (corr.).

Anal. Calcd. for $C_{11}H_{10}N_2O_3$: N, 12.84; N.E., 218.

Found: N, 12.71; N.E., 219.

1,7-Dimethyl-4-oxo-1,8-naphthyridine-3-carboxylic acid when tested according to standard in vitro bacteriological evaluation procedures was found to possess antibacterial activity, for example, to have bacteriostatic (Bs) and bactericidal (Bc) values (given here and hereinafter as log reciprocal minimum effective concentrations, mg./cc.) of 4.0 and 3.12, respectively, against *Clostridium welchii*.

EXAMPLE 5

7-Methyl-4-oxo-1-n-propyl-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-propyl iodide and a reflux period of 6 days. The reaction mixture was cooled and the solid that separated was collected and recrystallized from ethanol to yield 17.7 g. (72 percent) of 7-methyl-4-oxo-1-n-propyl-1,8-naphthyridine-3-carboxylic acid, m.p. 209.4°–210.2° C. (corr.).

Anal. Calcd. for $C_{13}H_{14}N_2O_3$: C, 63.40; H, 5.73; N, 11.38.

Found: C, 63.67; H, 5.87; N, 11.25.

7-Methyl-4-oxo-1-n-propyl-1,8-naphthyridine-3-carboxylic acid when tested according to standard in vitro bacteriological evaluation procedures was found to possess antibacterial activity, for example, to have Bs and Bc values, respectively, of 4.3 and <3.0 against *Staphylococcus aureus*, of 5.0 and 3.6 against *Eberthella typhi* and of 5.0 and 4.0 against *Clostridium welchii*. This same compound was found to have significant in vivo activity against *Klebsiella pneumoniae* in mice when administered orally or subcutaneously at a dose level as low as 100 mg./kg./d. and, also, against *Salmonella typhimurium* in mice when administered orally at a dose level as low as 200 mg./kg./d.

EXAMPLE 6

1-n-Butyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-butyl bromide and a reflux period of 5 days. The reaction mixture was cooled in an ice bath and the resulting precipitate was collected, washed with acetone and recrystallized twice from ethanol to yield about 14 g. of the product, 1-n-butyl-7-methyl-4-oxo-1,8-naphthyridine-3-carboxylic acid, m.p. 220.4°–222.0° C. (corr.).

Anal. Calcd. for $C_{14}H_{16}N_2O_3$: N, 10.77; N.E., 260.
Found: N, 10.69; N.E., 258.

1-n-Butyl-7-methyl-4-oxo-1,8-naphthyridine-3-carboxylic acid when tested according to standard in vitro bacteriological evaluation procedures was found to possess antibacterial activity, for example, to have Bs and Bc values (as defined hereinabove) of 3.6 and 3.12 against *Eberthella typhi*.

EXAMPLE 7

1-Isobutyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 24.5 g. of potassium hydroxide, 400 cc. of ethanol, 140 cc. of water, 45 cc. of isobutyl iodide and a reflux period of 8 days. The reaction mixture was chilled in an ice bath and the solid that separated was collected. The filtrate was acidified with hydrochloric acid, the mixture chilled in an ice bath, and the resulting precipitate collected. The two solid portions were combined and recrystallized three times from acetic acid to yield 7.8 g. of 1-isobutyl-7-methyl-4-oxo-1,8-naphthyridine-3-carboxylic acid, m.p. 234.8°–236.8° C. (corr.).

Anal. Calcd. for $C_{14}H_{16}N_2O_3$: N, 10.68; N.E., 268.
Found: N, 10.77; N.E., 260.

1-Isobutyl-7-methyl-4-oxo-1,8-naphthyridine-3-carboxylic acid when tested according to standard in vitro bacteriological evaluation procedures was found to possess antibacterial activity, for example, to have Bs and Bc values, respectively, of 4.3 and 3.6 against *Staphylococcus aureus*, of 4.3 and 3.3 against Eberthella typhi and 4.6 and 3.0 against *Clostridium welchii*. This same compound when tested as described above was found to potentiate hexobarbital sleeping time in three out of six mice at a dose level of 200 mg./kg.

EXAMPLE 8

7-Methyl-4-oxo-1-n-pentyl-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-pentyl iodide and a reflux period of 5 days. The reaction mixture was cooled in an ice bath and the resulting precipitate was collected and recrystallized twice from isopropyl alcohol, the second time using decolorizing charcoal. There was thus obtained 4.1 g. of 7-methyl-4-oxo-1-n-pentyl-1,8-naphthyridine-3-carboxylic acid, m.p. 171.4°–172.8° C. (corr.).

Anal. Calcd. for $C_{15}H_{18}N_2O_3$: C, 65.69; H, 6.62; N, 10.28.
Found: C, 66.01; H, 6.57; N, 10.15. 7Methyl-4-oxo-1-n-pentyl-1,8-naphthyridine-3- carboxylic acid when tested according to standard in vitro bacteriological evaluation procedures was found to possess antibacterial activity, for example, to have Bs and Bc values, respectively, of 4.12 and 3.12 against *Staphylococcus aureus* and of 4.12 and 3.3 against *Clostridium welchii*.

EXAMPLE 9

1-n-Hexyl-7-methyl-4-oxo-1,8-naphthyridine-3-carboxylic acid was prepared following the procedure described in Example 1 using 20.4 g. of 4-hydroxy-7-methyl-1,8-naphthyridine-3-carboxylic acid, 19.5 g. of potassium hydroxide, 400 cc. of ethanol, 140 cc. of water, 40 cc. of n-hexyl iodide and a reflux period of 5 days. The reaction mixture (pH 6.4) was made more acidic with concentrated hydrochloric acid and chilled in an ice bath. The resulting precipitate was collected and recrystallized twice from isopropyl alcohol, the second time using decolorizing charcoal. There was thus obtained 8.6 g. of the product, 1-n-hexyl-7-methyl-4-oxo-1,8-naphthyridine-3-carboxylic acid, a pale yellow solid, m.p. 146.2°–148.2° C. (corr.).

Anal. Calcd. for $C_{16}H_{20}N_2O_3$: C, 66.64; H, 6.99 N, 9.72.
Found: C, 66.93; H, 6.88; N, 9.60.

EXAMPLE 10

Ethyl 1-ethyl-7-methyl-4-oxo-1,8-naphthyridine-3-carboxylate was prepared as follows: A 6.9 g. portion of sodium was dissolved in 300 cc. of absolute ethanol (to produce a solution of sodium ethoxide in ethanol) and to the resulting solution was added 23.2 g. of ethyl 4-hydroxy-7-methyl-1,8-naphthyridine-3-carboxylate. The reaction mixture was brought to reflux on a steam bath and to the resulting suspension was added 35 cc. of ethyl iodide. The resulting reaction mixture was refluxed for 16 hours and chilled in an ice bath; and, when no solid separated, it was evaporated to about one-third its volume on a steam bath under reduced pressure, acidified, diluted and shaken well with four volumes of water, and filtered. The solid that separated from the filtrate was collected and recrystallized three times from ethyl acetate, the second time using decolorizing charcoal. There was thus obtained 7.0 g. of the product, ethyl 1-ethyl-7-methyl-4-oxo-1,8-naphthyridine-3-carboxylate, m.p. 120.8°–121.6° C. (corr.).

Anal. Calcd. for $C_{14}H_{16}N_2O_3$: C, 64.60; H, 6.19; N, 10.77.
Found: C, 64.58; H, 6.03; N, 10.93.

Ethyl 1-ethyl-7-methyl-4-oxo-1,8-naphthyridine-3-carboxylate was found to have significant in vivo activity against *Klebsiella pneumoniae* in mice when administered orally or subcutaneously at dose levels as low as 100 mg./kg./d.

EXAMPLE 11 n-Butyl 1-ethyl-7-methyl-4-oxo-1,8-naphthyridine-3-carboxylate was prepared as follows: A mixture containing 13 g. of ethyl 1-ethyl-7-methyl-4-oxo-1,8-naphthyridine-3-carboxylate, 25 cc. of n-butanol and 0.3 g. of sodium methoxide was heated in an oil bath at about 122°–125° C. for a period of 48 hours. The reaction mixture was then cooled, filtered, and the filtrate concentrated in vacuo to remove the solvent. The remaining reaction mixture solidified on cooling. The solid was collected and recrystallized from cyclohexane using decolorizing charcoal. The air-dried product, n-butyl 1-ethyl-7-methyl-4-oxo-1,8-naphthyridine-3-carboxylate, m.p. 98.0°–99.4° C. (corr.), weighed 8.8 g. (61 percent yield).

Anal. Calcd. for $C_{16}H_{20}N_2O_3$: C, 66.66; H, 6.98; N, 9.71.
Found: C, 66,49; H, 6.72; N, 9.64.

EXAMPLE 12

1,3-Dimethylbutyl 1-ethyl-7-methyl-4-oxo1,8-naphthyridine-3-carboxylate was prepared as follows: A mixture containing 11 g. of ethyl 1-ethyl-7-methyl-4-oxo-1,8-naphthyridine-3-carboxylate, 25 cc. of 4-methyl-2-pentanol and 0.1 g. of sodium methoxide was heated for about 16 hours in an oil bath kept at about 130°–135° C. The reaction mixture was cooled, filtered, and concentrated in vacuo to remove the solvent. The resulting solidified reaction mixture was recrystallized twice from cyclohexane, once from di-isopropyl ether, washed with n-pentane and dried in vacuo at 70° C. to yield 6.5 g. of product, 1,3-dimethylbutyl 1-ethyl-7-methyl-4-oxo-1,8-naphthyridine-3-carboxylate, m.p. 114.6°–119.4° C. (corr.).

Anal. Calcd. for $C_{18}H_{24}N_2O_3$: C, 68.36; H, 7.64; N, 8.84.
Found: C, 68.68; H, 7.25; N, 8.87.

EXAMPLE 13

Ethyl 1-ethyl-4-oxo-7-styryl-1,8-naphthyridine-3-carboxylate was obtained together with the corresponding carboxylic acid in the following synthesis: A mixture containing 64 g. of ethyl 4-hydroxy-7-styryl-1,8-naphthyridine-3-carboxylate, 52 g. of potassium hydroxide, 920 cc. of ethanol, 320 cc. of water, and 80 cc. of ethyl iodide was refluxed for about 16 hours. The acidic reaction mixture was cooled in an ice bath; and the resulting precipitate was collected, washed twice with acetone and dried to yield 39.0 g. of solid (see below). The acetone washings were diluted with water and the yellow precipitate that separated was collected, washed with boiling water, recrystallized once from acetic acid-water and a second time from absolute ethanol to yield 6.1 g. of ethyl 1-ethyl-4-oxo-7-styryl-1,8-naphthyridine-3-carboxylate, m.p. 174.2°–176.6° C. (corr.).

Anal. Calcd. for $C_{21}H_{20}N_2O_3$: C, 72.39; H, 5.79; N, 8.04.
Found: C, 72.15; H, 5.49; N, 8.30.

The above 39 g. of solid was washed with hot 10 percent aqueous potassium carbonate solution and the resulting suspension was acidified with hydrochloric acid and filtered.

The filtered product was washed with water and dried in an oven (70° C.) to yield about 39 g. (62 percent) of 1-ethyl-4-oxo-7-styryl-1,8-naphthyridine-3-carboxylic acid.

EXAMPLE 14

1Ethyl-4-oxo-1,8-naphthyridine-3,7-dicarboxylic acid was prepared as follows: To a stirred suspension con-taining 28.0 g. of 1-ethyl-4-oxo-7-naphthyridine-3-carboxylic acid in 192 cc. of pyridine and 35 cc. of water cooled to 15°–20° C. in an ice bath was added portionwise over a period of about 1 hour 36.8 g. of potassium permanganate. The temperature was kept at 15°–20° C. during the addition of the permanganate. After two 90 cc. portions of water were added to the reaction mixture, one after half of the permanganate had been added and the other after completion of the addition of the permanganate, the reaction mixture was stirred for an additional 30 minutes. After an unsuccessful attempt to remove the colloidal manganese dioxide by filtration, sodium bisulfite solution was added until all manganese dioxide had been destroyed. The mixture was than acidified with 6N sulfuric acid whereupon pale yellow solid separated. The solid was collected and dissolved in 10 percent aqueous potassium carbonate solution. This solution was filtered and to the filtrate was added hydrochloric acid to reprecipitate the product. The solid was collected, washed with water and recrystallized from acetic acid using decolorizing charcoal. It was then washed with acetone and dried in a vacuum oven at 70° C. to yield 5 g. (77 percent) of the product, 1-ethyl-4-oxo-1,8-naphthyridine-3,7-dicarboxylic acid, m.p. 282°–283.4° C. (corr.) with decomposition.

Anal. Calcd. for $C_{12}H_{10}N_2O_5$: N, 10.68; N.E. 131 and 262.
Found: N, 10.76; N.E., 129 and 273.

Using a molar equivalent quantity of ethyl 1-ethyl-4-oxo-7-styryl-1,8-naphthyridine-3-carboxylate in the above oxidation in place of the corresponding acid, there was obtained ethyl 1-ethyl-7-carboxy-4-oxo-1,8-naphthyridine-3-carboxylate, m.p. 241°–243° C.

EXAMPLE 15

Ethyl 7-carboxy-1-ethyl-4-oxo-1,8-naphthyridine-3-carboxylate was prepared as follows: A 60 gram portion of ethyl 1-ethyl-4-oxo-7-styryl-1,8-naphthyridine-3-carboxylate was suspended in a mixture of 380 cc. of pyridine and 66 cc. of water. The mixture was cooled to 10° C. and to it was added with stirring in small portions over a period of 90 minutes 85.5 g. of potassium permanganate. The temperature of the reaction mixture was kept at 10°–15° F. using an ice bath. At 30 minute intervals 110 cc. portions of water were added to facilitate stirring. Stirring was continued for an additional hour after all of the potassium permanganate had been added. The reaction mixture was then allowed to stand overnight allowing the temperature to rise to room temperature. The precipitated manganese dioxide was filtered off and washed with water. The filtrate and washings were combined and acidified with concentrated hydrochloric acid to yield a pale yellow precipitate. The mixture was cooled overnight in a cold room; and the precipitate was then collected, washed with a little water, washed with acetone, and air-dried to yield 33.9 g. (68 percent yield) of the product, ethyl 7-carboxy-1-ethyl-4-oxo-1,8-naphthyridine-3-carboxylate, m.p. 241°–243° C.

EXAMPLE 16

Ethyl 7-carboethylmercapto-1-ethyl-4-oxo-1,8-naphthyridine-3-carboxylate was prepared as follows: To a suspension of 10.0 g. of ethyl 7-carboxyl-1-ethyl-4-oxo-1,8-naphthyridine-3-carboxylate in 200 cc. of chloroform was added 4.8 g. of oxalyl chloride and the resulting mixture was refluxed on a steam bath. An additional 2.2 g. portion of oxalyl chloride was added after 15 minutes and again after 10 more minutes for a total of 9.2 g. of this reactant. Refluxing was continued for 5 minutes more, the reaction mixture cooled slightly, and 20 g. of ethyl mercaptan added. The mixture was stirred and allowed to stand at room temperature overnight. A small amount of insoluble material was filtered off and the filtrate was evaporated to dryness on steam bath to yield a brown solid residue which was washed well with ether, dried, and recrystallized from ethyl acetate (about 200 cc.) using decolorizing charcoal and dried at 80° C. for 2 hours to yield 6.3 g. of the product, ethyl 7-carboethylmercapto-1-ethyl-4-oxo-1,8-naphthyridine-3-carboxylate, m.p. 189.2°–190.8° C. (corr.).

Anal. Calcd. for $C_{16}H_{18}N_2O_4S$: N, 8.38: S, 9.59.
Found: N, 8.49; S, 9.71.

EXAMPLE 17

Ethyl 1-ethyl-7-hydroxymethyl-4-oxo-1,8-naphthyridine-3-carboxylate was prepared as follows: A mixture containing 3.3 g. of ethyl 7-carboethylmercapto-1-ethyl-4-oxo-1,8-naphthyridine-3-carboxylate, 20 g. of Raney nickel and 100 cc. of ethanol was refluxed on a steam bath with stirring for 3 days. The reaction mixture was filtered through a sintered glass funnel to remove the nickel catalyst; the catalyst rinsed with fresh ethanol; and the combined ethanol washings and filtrate from the reaction mixture were evaporated to dryness on a steam bath. The remaining residue was triturated with a small amount of ethyl acetate and the solid that formed was collected, washed with cold ethyl acetate and air-dried. This solid material was then boiled with ethyl acetate and the hot mixture filtered; most of the solid did not dissolve. The filtrate on cooling yielded a crystalline product which was recrystallized again from ethyl acetate to yield a small quantity of the desired product, ethyl 1-ethyl-7-hydroxymethyl-4-oxo-1,8-naphthyridine-3-carboxylate, m.p. 173.5°–174.0° C.

Anal. Calcd. for $C_{14}H_{16}N_2O_4$: N, 10.14; C, 60.86; H, 5.84.
Found: N, 10.19; C, 61.14; H, 5.52.

EXAMPLE 18

1-Ethyl-7-hydroxymethyl-4-oxo-1,8-naphthyridine-3-carboxylic acid was prepared by hydrolyzing its ethyl ester as follows: A mixture of a small portion of the ethyl ester and 5 percent aqueous potassium hydroxide was boiled for 2 to 3 minutes, after which time the ester had dissolved; boiling was continued for another 2 minutes and the reaction mixture was allowed to cool slowly. The cooled solution was made slightly acidic with 6N hydrochloric acid. The white precipitate was collected, washed successively with water and acetone, recrystallized from absolute ethanol, and air-dried to yield the desired product, 1-ethyl-7-hydroxymethyl-4-oxo-1,8-naphthyridine-3-carboxylic acid, m.p. 258°–260° C.

Anal. Calcd. for $C_{12}H_{12}N_2O_4$: C, 58.06; H, 4.87; N, 11.29.
Found: C, 57.98; H, 4.94; N, 11.33.

1-Ethyl-7-hydroxymethyl-4-oxo-1,8-naphthyridine-3-carboxylic acid was found to have significant in vivo activity against *Klebsiella pneumoniae, Escherichia coli, Salmonella typhimurium* and *Staphylococcus aureus* Smith in mice when administered orally at respective doses of 25, 12.5, 25 and 600 mg./kg./d.

EXAMPLE 19

7-Acetoxymethyl-1-ethyl-4-oxo-1,8-naphthyridine-3-carboxylic acid was prepared by acylating the corresponding 7-hydroxymethyl compound as follows: A mixture containing 10.0 g. of 1-ethyl-7-hydroxymethyl-4-oxo-1,8-naphthyridine-3carboxylic acid, 8.2 g. of acetic anhydride and 50 cc. of pyridine was warmed on a steam bath for 1 hour. The reaction mixture was then poured into a mixture of ice and water with stirring followed by addition of 20 cc. of acetic acid. The mixture was stirred; and the precipitate was collected, recrystallized twice from isopropyl alcohol and dried in vacuo at 70° C. for 7 hours to yield 8.0 g. of the product, 7-acetoxymethyl-1-ethyl-4-oxo-1,8-naphthyridine-3-carboxylic acid, m.p. 169.8°–171.6° C. (corr.).

Anal. Calcd. for $C_{14}H_{14}N_2O_5$: C, 57.93; H, 4.86; N, 9.65.
Found: C, 57.63; H, 4.84; N, 9.79.

7Acetoxymethyl-1-ethyl-4-oxo-1,8-naphthyridine-3-carboxylic acid was found to have significant in vivo activity against *Klebsiella pneumoniae, Escherichia coli* and *Salmonella typhimurium* in mice when administered orally at respective dose levels of 50, 50 and 100 mg./kg./d.

EXAMPLE 20

7-(Diethylaminoacetoxymethyl)-1-ethyl-4-oxo-1,8-naphthyridine-3-carboxylic acid was prepared as follows: A mixture containing 7.0 g. of 7-chloroacetoxymethyl-1-ethyl-4-oxo-1,8-naphthyridine-3-carboxylic acid, 20 cc. of diethylamine and 100 cc. of ethanol was refluxed gently on a steam bath for 3 hours and then evaporated to dryness in vacuo. The remaining solid material was taken up in water; the aqueous mixture filtered; and the filtrate acidified with acetic acid. The resulting precipitate was collected, recrystallized successively from isopropyl alcohol and acetic acid, washed with acetone and air-dried to yield 2.5g. of the product, 7-(diethylaminoacetoxymethyl)-1-ethyl-4-oxo-1,8-naphthyridine-3-carboxylic acid, m.p. 249.8°–255.0° C. (corr.).

Anal. Calcd. for $C_{18}H_{23}N_3O_5$: C, 59.82; H, 6.42; N, 11.62.
Found: C, 69.75; H, 6.52; N, 11.49.

7-(Diethylaminoacetoxymethyl)-1-ethyl-4-oxo-1,8-naphthyridine-3-carboxylic acid was found to have significant in vivo activity against *Klebsiella pneumoniae* in mice when administered orally at a dose level of 100 mg./kg./d.

The intermediate 7-chloroacetoxymethyl-1-ethyl-4-oxo-1,8-naphthyridine-3-carboxylic acid was prepared as follows: A mixture containing 17.4 g. of 1-ethyl-7-hydroxymethyl-4-oxo-1,8-naphthyridine-3-carboxylic acid, 24.0 g. of chloroacetic anhydride and 150 cc. of acetic acid was heated on a steam bath with stirring for 3 hours and then poured into 2 liters of water with stirring. The solid precipitate was collected and recrystallized from isopropyl alcohol to yield 7-chloroacetoxymethyl-1-ethyl-4-oxo-1,8-naphthyridine-3-carboxylic acid, m.p. 159°–163° C., which was used in the above reaction without further recrystallization.

EXAMPLES 21-23

The 7-hydroxymethyl-1-substituted-4-oxo-1,8-naphthyridine-3-carboxylic acids of Table A below can be prepared following the procedures of Examples 16, 17 and 18 using molar equivalent quantities of the corresponding ethyl 7-carboxy-4-oxo-1-substituted-1,8-naphthyridine-3-carboxylate in place of ethyl 7-carboxy-1-ethyl-4-oxo-1,8-naphthyridine-3-carboxylate, to prepare first the corresponding ethyl 7-carboethylmercapto- 1substituted-4-oxo-1,8 - naphthyridine-3-carboxylate, then the corresponding ethyl 7-hydroxymethyl-1-substituted-4-oxo-1,8-naphthyridine-3-carboxylate, and finally the corresponding 7-hydroxymethyl-1-substituted-4-oxo-1,8-naphthyridine-3-carboxylate, and finally the corresponding 7-hydroxymethyl-1-substituted-4-oxo-1,8-naphthyridine-3-carboxylic acid.

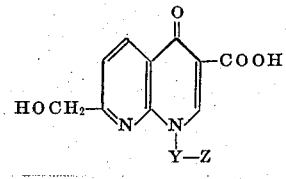

| Ex. No. | Y-Z | M.P., °C. |
|---|---|---|
| 21 | $CH_2CH_2CH_3$ | 208.5–210 |
| 22 | $(CH_2)_5CH_3$ | 170–171.5 |
| 23 | $CH_3$ | 295– >320 |

The intermediate ethyl 7-carboxy-4-oxo-1-substituted-1,8-naphthyridine-3-carboxylates can be prepared following the procedure described in Example 14 by oxidizing the corresponding ethyl 4-oxo-7-styryl-1-substituted-1,8-naphthyridine-3-carboxylate.

7-Hydroxymethyl-4-oxo-1-n-propyl-1,8-naphthyridine-3-carboxylic acid (Example 21) was found to have significant in vivo activity against *Klebsiella pneumoniae, Salmonella typhimurium* and *Proteus rettgeri* in mice when administered orally at respective dose levels of 50, 400 and 200 mg./kg./d. This same compound when tested as described hereinabove was found to potentiate hexobarbital sleeping time in four out of 10 mice at a dose level of 100 mg./kg.

EXAMPLE 24

4-Oxo-1-n-propyl-1,8-naphthyridine-3,7-dicarboxylic acid was prepared as follows: A mixture containing 1g. of 7-hydroxymethyl-4-oxo-1-n-propyl-1,8-naphthyridine-3-carboxylic acid, 2 g. of potassium permanganate, 100 cc. of water and about 60 drops of 10 percent aqueous potassium hydroxide solution as stirred for 2 hours. The excess potassium permanganate was st reduced using sodium bisulfite. The precipitate of manganese dioxide was filtered off and washed with water. The filtrate and washings were combined and acidified with hydrochloric acid. The resulting precipitate was collected and recrystallized from ethanol to yield the product, 4-oxo-1-n-propyl-1,8-naphthyridine-3,7-dicarboxylic acid, m.p. 251.2°–252.2° C. (corr.).

Anal. Calcd. for $C_{13}H_{12}N_2O_5$: C, 56.52; H, 4.38; N, 10.14; O, 28.96.
Found: C, 56.53; H, 4.19; N, 10.32; O, 28.96.

EXAMPLE 25

7-Acetoxymethyl-1-n-propyl-4-oxo-1,8-naphthyridine-3-carboxylic acid was prepared as follows: A mixture containing 2.12 g. of 7-hydroxymethyl-1-n-propyl-4-oxo-1,8-naphthyridine-3-carboxylic acid, 50 cc. of acetic anhydride and 40 cc. of pyridine was allowed to stand for 90 minutes. The reaction mixture was added to a mixture of ice and cold water and allowed to stand overnight in a refrigerator. The resulting white solid was collected, washed successively with water and a small amount of ether, and recrystallized from ethanol to yield 1.95 g. of the product, m.p. 149.2°–150.4° C. (corr.).

Anal. Calcd. for $C_{15}H_{16}N_2O_5$: C, 59.20; H, 5.30; N,9.20.
Found: C, 59.36; H, 5.36; N, 9.32.

7-Acetoxymethyl-1-n-propyl-4-oxo-1,8-naphthyridine-3-carboxylic acid was found to have significant in vivo activity against *Klebsiella pneumoniae* and *Escherichia coli* in mice when administered orally at respective dose levels of 200 and 100 mg./kg./d.

EXAMPLE 26

7-Dichloroacetoxymethyl-1-ethyl-4-oxo-1,8-naphthyridine-3-carboxylic acid was prepared as follows: A mixture of 1-ethyl-7-hydroxymethyl-4-oxo-1,8-naphthyridine-3-carboxylic acid and 5 cc. of dichloroacetic anhydride was placed in a warm water bath for about 15 minutes and then poured into ice water whereupon a yellow oil separated. The water was decanted and the oil washed once with water whereupon it solidified. The solid was then recrystallized from ethanol, using decolorizing charcoal, to yield 3.2 g. of the product, 7-dichloroacetoxymethyl-1-ethyl-4-oxo-1,8-naphthyridine-3-carboxylic acid, m.p. 133.0°–139.4° C. (corr.).

Anal. Calcd. for $C_{14}H_{12}Cl_2N_2O_5$: N, 7.80; C, 19.75.
Found: N, 8.09; C, 19.41.

7-Dichloroacetoxymethyl-1-ethyl-4-oxo-1,8-naphthyridine-3-carboxylic acid was found to have significant in vivo activity against *Klebsiella pneumoniae* in mice when administered orally at a dose level of 200 mg./kg./d.

EXAMPLE 27

7-Isobutyroxymethyl-1-ethyl-4-oxo-1,8-naphthyridine-3-carboxylic acid was prepared as follows: A mixture containing 2 g. of 1-ethyl-7-hydroxymethyl-4-oxo-1,8-naphthyridine-3-carboxylic acid, about 8 cc. of isobutyric anhydride and about 50 cc. of pyridine was warmed in a water bath for about 3 hours. The reaction mixture was poured onto crushed ice and the resulting precipitate was collected and recrystallized from ethanol to yield 1.47 g. of the product, 7-isobutyroxymethyl-1-ethyl-4-oxo-1,8-naphthyridine-3-carboxylic acid, m.p. 139.2°–141.2° C. (corr.).

Anal. Calcd. for $C_{16}H_{18}N_2O_5$: C, 60.37; H, 5.70; N, 8.80.
Found: C, 60.13; H, 5.74; N, 8.61.

7-Isobutyroxymethyl-1-ethyl-4-oxo-1,8-naphthyridine-3-carboxylic acid was found to have significant in vivo activity against *Klebsiella pneumoniae* in mice when administered orally at 200 mg./kg./d.

EXAMPLE 28

1-Ethyl-4-oxo-7-succinoxymethyl-1,8-naphthyridine-3-carboxylic acid was prepared as follows: A mixture containing 2 g. of 1-ethyl-7-hydroxymethyl-4-oxo-1,8-naphthyridine-3-carboxylic acid, 1.5 g. of succinic anhydride and about 50 cc. of pyridine was warmed on a water bath for about 3 hours and then poured onto crushed ice. The resulting mixture was made acidic to litmus using hydrochloric acid, and the precipitate that separate was collected and recrystallized from water to yield 2.15 g. of the product, 1-ethyl-4-oxo-7-succinoxymethyl-1,8-naphthyridine-3-carboxylic acid, m.p. 145.8°–148.2° C. (corr.).

Anal. Calcd. for $C_{16}H_{16}N_2O_7$: C, 55.17; H, 4.63; N, 8.04.
Found: C, 55.11; H, 4.53; N, 8.11.

1-Ethyl-4-oxo-7-succinoxymethyl-1,8-naphthyridine-3-carboxylic acid was found to have significant in vivo activity against *Klebsiella pneumoniae* in mice when administered orally at a dose level of 400 mg./kg./d.

EXAMPLE 29

1-Ethyl-4-oxo-7-propionoxymethyl-1,8-naphthyridine-3-carboxylic acid was prepared following the procedure described in Example 160 using 2 g. of 1-ethyl-8-hydroxymethyl-4-oxo-1,8-naphthyridine-3-carboxylic acid, 6 cc. of propionic anhydride and about 50 cc. of pyridine. There was thus obtained 1.54 g. of the product, 1-ethyl-4-oxo-7-propionoxymethyl-1,8-naphthyridine-3-carboxylic acid, m.p. 149.8°–151.0° C. (corr.), after one recrystallization from ethanol.

Anal. Calcd. for $C_{15}H_{16}N_2O_5$: C, 59.20; H, 5.30; N, 9.21.
Found: C, 58.86; H, 4.97; N, 9.46.

1-Ethyl-4-oxo-7-propionoxymethyl-1,8-naphthyridine-3-carboxylic acid was found to have significant in vivo activity against *Klebsiella pneumoniae* in mice when administered orally at a dose level of 200 mg./kg./d.

EXAMPLE 30

7-Butyroxymethyl-1-ethyl-4-oxo-1,8-napthyridine-3-carboxylic acid was prepared following the procedure described in Example 27 using 2 g. of 1-ethyl-7-hydroxymethyl-4-oxo-1,8-naphthyridine-3-carboxylic acid, about 8 cc. of butyric anhydride and about 50 cc. of pyridine. There was thus obtained 1.76 g. of the product, 7-butyroxymethyl-1-ethyl-4-oxo-1,8-naphthyridine-3-carboxylic acid, m.p. 128.2°–129.4° C. (corr.), after one recrystallization from ethanol-water.

Anal. Calcd. for $C_{16}H_{18}N_2O_5$: C, 60.37; H, 5.70; N, 8.80.
Found: C, 59.88; H, 5.47; N, 9.10.

7-Butyroxymethyl-1-ethyl-4-oxo-1,8-naphthyridine-3-carboxylic acid was found to have significant in vivo activity against *Klebsiella pneumoniae* in mice when administered orally at a dose level of b 200 mg./kg./d.

We claim:
1. A compound of the formula

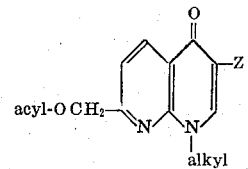

where Z is COOH or COO-alkyl, alkyl in each instance has from one to six carbon atoms, and acyl has from one to six carbon atoms and is selected from alkanoyl, mono- or di-haloalkanoyl, carboxy-alkanoyl or dialkylaminoalkanoyl.

2. 7-Acetoxymethyl-1-ethyl-4-oxo-1,8-naphthyridine-3-carboxylic acid according to claim 1.

3. 7-(Diethylaminoacetoxymethyl)-1-ethyl-4-oxo-1,8-naphthyridine-3-carboxylic acid according to claim 1.

4. 7-Chloroacetoxymethyl-1-ethyl-4-oxo-1,8-naphthyridine-3-carboxylic acid according to claim 1.

5. 7-Acetoxymethyl-1-n-propyl-4-oxo-1,8-naphthyridine-3-carboxylic acid according to claim 1.

6. 7-Dichloroacetoxymethyl-1-ethyl-4-oxo-1,8-naphthyridine-3-carboxylic acid according to claim 1.

7. 7-Isobutyroxymethyl-1-ethyl-4-oxo-1,8-naphthyridine-3-carboxylic acid according to claim 1.

8. 1-Ethyl-4-oxo-7-succinoxymethyl-1,8-naphthyridine-3-carboxylic acid according to claim 1.

9. 1-Ethyl-4-oxo-7-propionoxymethyl-1,8-naphthyridine-3-carboxylic acid according to claim 1.

10. 7-Butyroxymethyl-1-ethyl-4-oxo-1,8-naphthyridine-3-carboxylic acid according to claim 1.

* * * * *